April 8, 1930.  F. L. SUTTON  1,753,484
CARBURETOR FEED RETARDING DEVICE
Filed Jan. 14, 1926
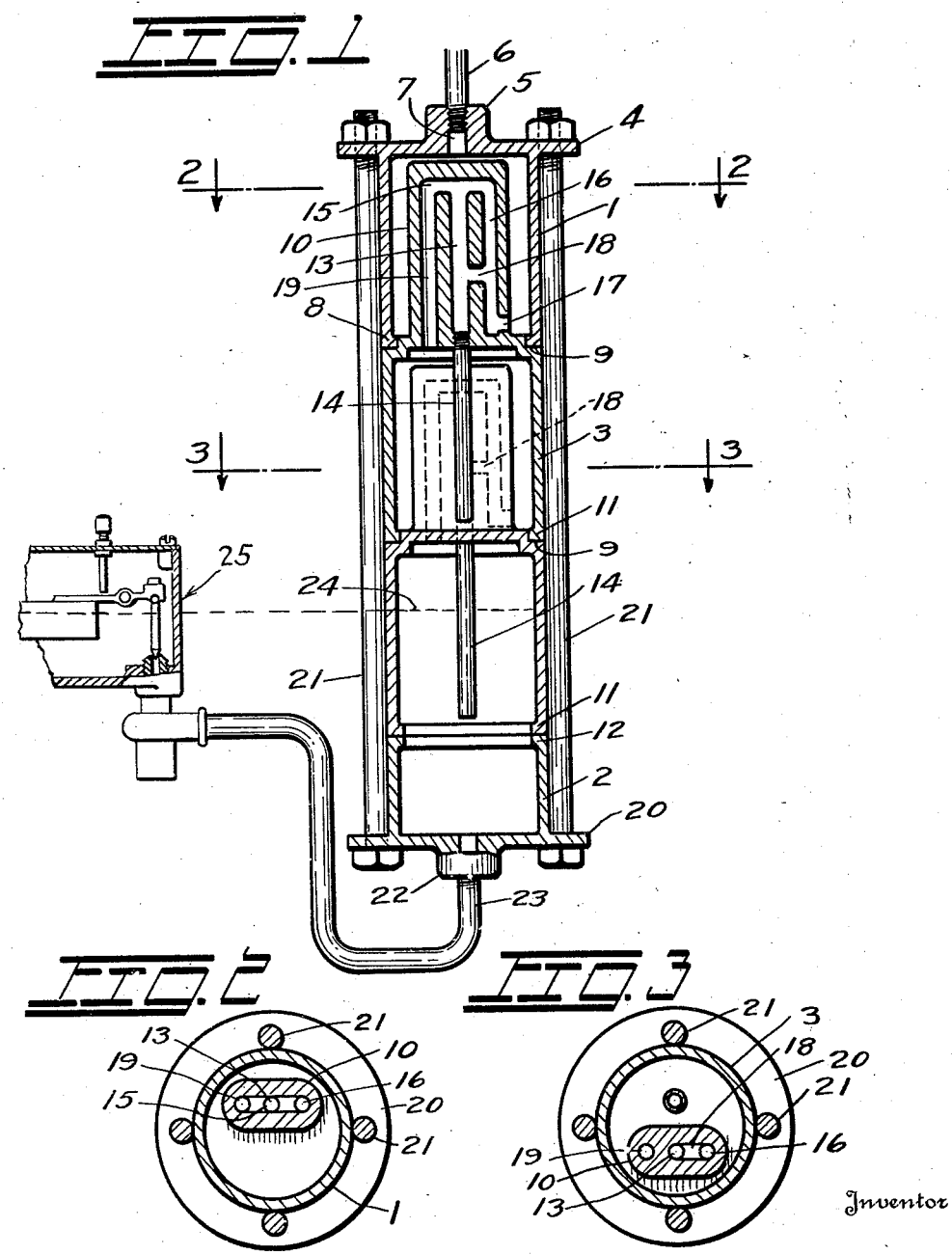
Inventor
Frank L. Sutton
By Harry Bowen
Attorney Patented Apr. 8, 1930

1,753,484

UNITED STATES PATENT OFFICE

FRANK L. SUTTON, OF SEATTLE, WASHINGTON, ASSIGNOR OF ONE-HALF TO HARRY MAXWELL FINNEY, OF SEATTLE, WASHINGTON

CARBURETOR-FEED-RETARDING DEVICE

Application filed January 14, 1926. Serial No. 81,338.

The invention is a flow retarding device for preventing over-feeding or flooding of the carburetor of internal combustion engines where the fuel is fed by gravity.

The object of the invention is to provide a means for preventing over-feeding or flooding of the carburetor when the supply tank is full.

Another object of the invention is to provide a device through which the gasoline being fed through the carburetor must pass, which will retard the flow of the gasoline.

A further object of the invention is to provide a flow retarding device for feeding a fluid from a tank which is readily adjustable to different depths.

A still further object of the invention is to provide an adjustable flow retarding device for feeding a liquid from a tank, which is provided with air cushions to control the flow of the liquid there through.

And a still further object of the invention is to provide a readily adjustable flow retarding device for feeding a liquid from a tank, which is of a simple and economical construction.

With these ends in view the invention embodies a device formed with an upper casing, a lower casing and several intermediate casings, all of which are held together by bolts in flanges of the upper and lower casings, the said intermediate casings having upwardly extending projections with openings in them, and tubes extending downward from their lower ends, and the said device being arranged so that the liquid will enter the upper end, and after passing through the openings in the intermediate sections, pass out of the lower end.

Other features and advantages of the invention will appear from the following description taken in connection with the drawings, wherein:—

Figure 1 is a vertical cross section approximately through the center of the device.

Figure 2 is a sectional plan on line 2—2 of Figure 1.

Figure 3 is a sectional plan on line 3—3 of Figure 1.

In the drawings I have shown my device as it would be made wherein numeral 1 indicates the upper casing, numeral 2 the lower casing and numeral 3 one of the intermediate casings.

All the casings are made of a cylindrical shape and the upper casing 1 is provided with a flange 4 having a boss 5 in the center into which a supply pipe 6 is screwed. The opening 7 in the boss extends to the interior of the casing so that the fuel supplied through the pipe 6 may readily pass through the interior of the casing. The lower end of the casing is provided with a boss 8, which fits into a recess 9 in one of the intermediate casings 3, and it will be observed that as the upper casing 1 is placed over the intermediate casing a projection 10 will extend upward into the upper casing and the boss 8 will fit into the recess 9 to seal the joint between the two casings. The lower end of the intermediate casing 3 is also provided with a boss similar to the boss 8, and which is indicated by the numeral 11, and it will be observed that this boss may fit into a recess 9 of another intermediate casing, or may rest upon a similar boss 12 at the upper end of the lower casing 2.

The projection 10 of the intermediate casings is made in an oblong shape as shown in Figures 2 and 3, and provided with vertical and horizontal openings as shown in Figure 1. These openings are arranged with a vertical central opening 13, having a tube 14 threaded into its lower end and its upper end opening into a horizontal opening 15. At one side of this opening is another similar opening 16, which also extends into the opening 15 at the upper end, and is provided with an opening 17 at the lower end, which connects it to the interior of the upper or adjoining casing. The opening 16 is also provided with a passage 18 about midway of its length, which connects it to the opening 13 in the center of the projection 10. On the opposite side of the opening 13 is another similar vertical opening 19 which opens into the opening 15 at the upper end of the projection, and also opens into the interior of the casing at the lower end. It will be observed that each of the projections of the intermediate casings are provided with similar openings and as many sections as may be desired may be installed in one device to provide a device of any suitable depth.

The lower casing is also provided with a flange 20, which is similar to the flange 4 of the upper casing and all of the casings are held together by bolts 21 which pass through these flanges. The lower casing 2 is also provided with a boss 22 which has a pipe 23 extending from it to the supply connection of the carburetor.

It is understood that changes may be made in the construction without departing from the spirit of the invention. One of which changes may be in the making of the casings in any other shape instead of circular as shown and described, another may be in the design or arrangement of the openings in the projections of the intermediate casings, and still another may be in the use of other means for holding the different casings together.

The construction will be readily understood from the foregoing description. To use the device it may be installed in combination with a carburetor, and the upper end of the device will be connected through the pipe 6 to the supply tank and the lower end will be connected through the pipe 23 to the carburetor. It will be observed that the liquid will flow through the pipe 6 and pass through the openings in the projections until enough liquid has been supplied to the device to fill the lower end approximately to the point indicated by the dotted line 24, which is approximately the desired level of the liquid in the carburetor which is indicated by the numeral 25. This will cause the air in the intermediate sections to back up into the openings in the projections 10, thereby forming air cushions and only permitting the liquid to pass through them as the liquid is used from the lower end.

When priming the device the air in the respective chambers will be forced downward into the chamber below and the liquid will flow through the openings 18 so that it will drop through the tube 14 until the liquid in the chamber below reaches the level of the openings 18 and that in the lower chamber reaches the point indicated by the numeral 24 which is the level of the liquid in the float chamber of a carburetor. It will be observed that the pipe 23 extends from the device to the carburetor and is connected to the supply connection at the bottom of the float chamber so that as the level of the liquid in the float chamber rises and falls the level of the liquid in the lower end of this device, which is indicated by the line 24, will also rise and fall. This level may vary slightly with different types of carburetors.

Having thus fully described the invention, what I claim as new and desire to secure by Letters Patent, is:

1. In a device of the class described, a plurality of cylindrical shaped casings, means for holding the said casings together in a vertical position, pipe connections at the upper and lower ends of the said device, projections extending upwardly from the intermediate casings, said projections having a plurality of vertical openings therein, all of which are connected at the top and two of which are open at the bottom, and one of which is closed at the bottom, and provided with an opening to the exterior of the said projection, and another opening about midway of its length, connecting it to one of the other openings, and a tube extending downward from the lower end of the said latter opening.

2. In an automatic liquid feeding device, a plurality of detachable casings, an inlet connection in the upper end of the upper casing, an outlet connection in the lower end of the lower casing, inner tubular members having vertical passages therein within the said casings one of the said passages opening into the lower end of its respective casing and being joined by a transverse opening about midway of its length to a central passage and at the top to the central passage and also to another passage that extends downward through the lower end of the casing, and an inner tubular member extending from the lower end of the central passage of one casing to a point adjacent to the lower end of the adjoining casing below.

3. In a device of the class described a plurality of tubular casings positioned one above the other, the inner of the said casings having extensions extending upward into the adjoining casings, said extensions having vertical passages closed at their upper ends to the exterior and connected by a transverse opening to each other, one of the said passages opening into the lower end of the adjoining casing, one of the said passages opening into the inner part of the casing to which the extension is attached and another of the said passages provided with a tubular member extending to the lower end of the said casing, and a transverse opening connecting the said passage having a tubular member in the lower end thereof to the passage opening into the adjoining casing, said transverse opening being about mid-way of the length of said passages, and suitable inlet and outlet connections at the upper and lower ends of the said casings.

In testimony whereof I hereby affix my signature.

FRANK L. SUTTON.